US007814165B2

(12) United States Patent
Peters

(10) Patent No.: US 7,814,165 B2
(45) Date of Patent: Oct. 12, 2010

(54) MESSAGE CLASSIFICATION SYSTEM AND METHOD

(75) Inventor: Johan C. Peters, Baden-Wuerttemberg (DE)

(73) Assignee: SAP AG, Walldorf (DE)

( * ) Notice: Subject to any disclaimer, the term of this patent is extended or adjusted under 35 U.S.C. 154(b) by 988 days.

(21) Appl. No.: 11/319,434

(22) Filed: Dec. 29, 2005

(65) Prior Publication Data
US 2007/0156820 A1 Jul. 5, 2007

(51) Int. Cl.
*G06F 15/16* (2006.01)
(52) U.S. Cl. ...................... 709/207; 709/206
(58) Field of Classification Search ............... None
See application file for complete search history.

(56) References Cited

U.S. PATENT DOCUMENTS

| 6,772,143 | B2 * | 8/2004 | Hung ..................... 1/1 |
| 6,847,989 | B1 * | 1/2005 | Chastain et al. ............. 709/207 |
| 7,308,252 | B2 * | 12/2007 | Rybak et al. ............. 455/412.1 |
| 2003/0145058 | A1 * | 7/2003 | Chan et al. ................. 709/206 |
| 2004/0210640 | A1 * | 10/2004 | Chadwick et al. .......... 709/207 |
| 2009/0125528 | A1 * | 5/2009 | Choi ........................ 707/100 |

OTHER PUBLICATIONS

Real Time Email Compliance and User Archive, Active Policy Manager and Archive (APMA), http://www.metalogic-inc.com/apma/apmahome-2.htm (last visited Apr. 18, 2007).

* cited by examiner

*Primary Examiner*—Dohm Chankong
*Assistant Examiner*—Yanet Rodriguez
(74) *Attorney, Agent, or Firm*—Kenyon & Kenyon LLP

(57) ABSTRACT

An automatic message classification system includes a set of stored messages. Each message contains address identifiers. An incoming message processor delivers incoming messages to the system, each containing incoming address identifiers. A list of address identifiers is created by retrieving each address identifier of each message within the set of stored messages and adding the address identifier to the list if it does not already exist in the list. A central processor calculates a predictive address value for each address identifier in the list of address identifiers by dividing one by the number of occurrences of the address identifier in all messages within the set of stored messages. A central processor of the system compares the incoming address identifiers with the address identifiers of each message located within the set of stored messages to generate a predictive message value for each message. The predictive message value is the sum of the predictive address values for every incoming address identifier that also exists in the address identifiers of each message. The system classifies the incoming message with the message having the highest predictive message value.

19 Claims, 4 Drawing Sheets

Messages in a Set of Messages

| Message Number | From | To | CC | Subject | Attachment |
|---|---|---|---|---|---|
| 1 | A | B | C; D | Re: A's raise | ... |
| 2 | A | B; F | A | New Hire | ... |
| 3 | B | A | C | ... | ... |
| 4 | B | F | G | ... | ... |
| 5 | F | B | C | ... | ... |
| 6 | F | B | D | ... | ... |
| 7 | F | B | E | ... | ... |
| 8 | F | B | D | .... | .. |
| 9 | F | B | C | ... | ... |
| 10 | F | B | G | ... | ... |

FIG. 3

MESSAGE CLASSIFICATION SYSTEM AND METHOD

BACKGROUND

In modern computer systems, classifying the volumes of emails people receive today has become a time consuming task. Services such as GMail (www.gmail.com) allow people to store two gigabytes of email. Incoming email piles up quickly if not processed constantly. Hunting through this mountain of email poses a daunting task for anyone. Solutions are required that allow messages to be automatically classified when received. This allows messages to remain grouped without requiring the user to spend large amounts of time classifying the messages.

Several solutions address the problem of sorting incoming messages, but each suffers from a significant drawback. First, the earliest "Mailsend" programs in the Unix operating environment allowed a user to create a file of rules which, when applied, could search the from, to, subject, or body of emails for patterns. The program would then sort the incoming mail into folders based on these rules. The major drawback was that the format of the rules was complicated, often requiring a system administrator to set up.

Second, improvements on Mailsend allowed the user to use wizards and other shortcuts to avoid the complexities of rule creation. For example, Microsoft's Outlook program presents the user with such a wizard. The first step asks whether email should be processed upon sending or receipt. The next step asks whether Outlook should classify messages based on information located in the message headers (subject, from, to, cc, etc.), user-definable classifications, existence of attachments, existence of special flags (such as priority flags), etc. Finally, Outlook can group the incoming messages together into folders based on the rules. This solution, while made easier, still requires significant overhead because the rules must be defined manually and in advance of run time execution.

Other solutions employ complicated, text-analysis algorithms to judge the "relatedness" of incoming messages to messages in the system. These systems can easily fail due to spelling errors, fragmented sentences, abbreviations, and the inability to capture similarity of synonyms. Therefore, there is a need in the art for an e-mail filing system that files received e-mail messages without requiring manual definition of filing rules.

BRIEF DESCRIPTION OF THE DRAWINGS

FIG. 3 contains a sample chart used by way of example to illustrate the current invention.

DETAILED DESCRIPTION

Embodiments of the present invention provide a message classification system that compares characteristics of a newly received message against characteristics of previously-classified messages. The classification system collects address information from the stored messages. The system uses the address information to develop predictive address values that will determine how uniquely a particular address can serve to predict how to classify future messages. When a new message arrives in the system, the system calculates predictive message values that predict how closely the new message is related to each of the previously-classified messages. The system calculates these predictive message values based on adding the predictive address values for each stored message that it earlier calculated and then selecting the one that has the highest predictive characteristics when compared to the new message. The system then classifies the highest predictive message with the newly received message.

Figure 1:
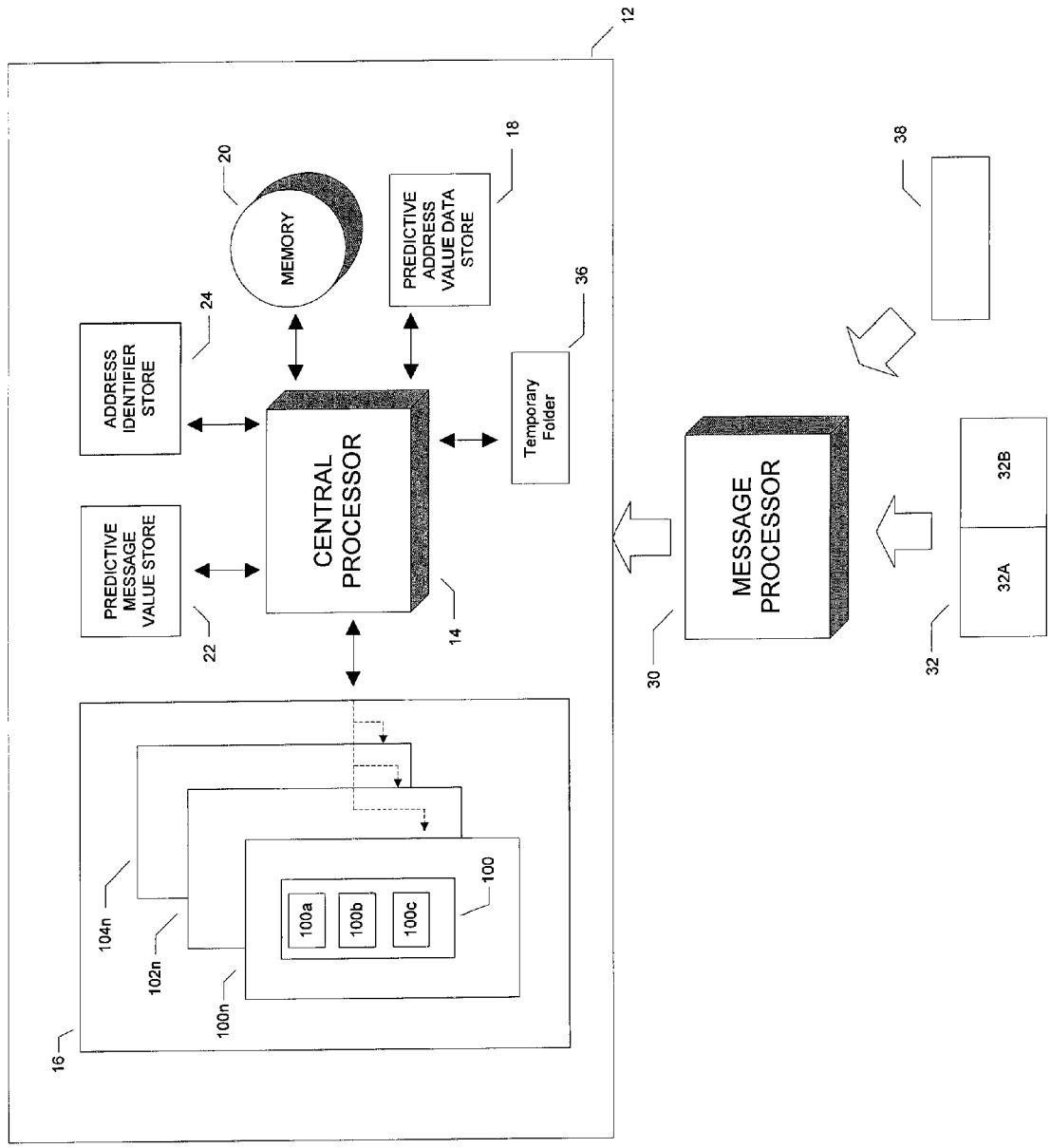
FIG. 1 depicts a block diagram of one embodiment of the present invention capable of classifying incoming messages based on predictive message values.

FIG. 1 illustrates a message classification system including a messaging system 12. The messaging system 12 includes a central processor 14 in communication with a set of stored messages 16 for storing a user's messages, a predictive address value data store 18 for storing the predictive values for each address in the messaging system 12, memory 20, and predictive message value store 22.

The message system 12 and associated central processor 14 allow messages to be categorized and stored. It further processes and stores incoming messages so that the user can view the messages at a later time. In one embodiment, the message system 12 may include functionality found in common email systems.

The set of stored messages 16 may exist on any suitable data store or memory device which allows messages to be stored, retrieved, and clustered by the central processor 14, such as in a relational database, object oriented database, in RAM, on another system across a network, or the like. Not by way of limitation, the set of stored messages 16 is herein described as an object oriented database in which each object is a folder of messages.

The predictive address value data store 18 may be any suitable memory device or data store that allows relationships to be created between address identifiers and the predictive address values associated with the respective address identifiers. Not by way of limitation, the predictive address value data store 18 is herein implemented with a two dimensional array, one dimension consisting of the address identifiers and the other consisting of the predictive address values. The predictive message value store 22 is similarly implemented.

Messages 100, 102, and 104 may be stored in the set of stored messages 16 within folders 100n, 102n, and 104n respectively. The message system 12 may also be in communication with incoming message processor 30 that delivers incoming message 32 to the messaging system 12 and thereby classifies the incoming message 32 with one of the message 100, the message 102, or the message 104 based at least in part on the predictive message values of the respective message.

The system may contain predictive address values that may measure how uniquely a particular address identifier will serve to predict future messages. For example, in a message store where all messages contain the address identifier thomas@internet.com and only one message contains the address identifier george@internet.com, george@internet.com may better serve to classify future messages. An incoming message with the address thomas@internet.com can be matched up with any message in the message store. An incoming message with george@internet.com will only match with the single message. Therefore, george@internet.com may have a higher predictive address value.

The system may calculate predictive address values. The system 12 may first extract all unique address identifiers from the messages stored in the set of stored messages 16. To do this, the central processor 14 may query the set of stored messages 16 to deliver each message in turn and may compare each address identifier against a running list of identifiers.

The central processor 14 may first receive a message 100 from the set of stored messages 16 in response to its query. Then, it may extract address identifiers 100*a*, 100*b*, and 100*c* from the message 100. The central processor 14 may compare the address identifier 100*a* with the address identifiers already stored in an address identifier store 24. The comparison may either locate the address identifier 100*a* in the address identifier store 24, signifying that it is unique, or it does not, signifying that it is not unique. If the address identifier 100*a* is unique in the address identifier store 24, then it may add the address identifier 100*a* to the address identifier store 24. Initially, the address identifier store 24 is empty because it contains no addresses. In this case, the address identifier 100*a* may automatically be added to the address identifier store 24 because it is automatically unique. Along with storing the address identifier 100*a*, the address identifier store may tally the number of occurrences of the address identifier 100*a* in all messages. For example, where it is determined that the address identifier 100*a* is not unique, the system may increase a counter associated with the address identifier signifying that an additional message with the address identifier 100*a* was encountered. Where messages contain multiple instances of the same address identifier, the system may increase the counter once for that message. If the address identifier 100*a* is not unique, then the system may move on to the next address and may not add the address identifier 100*a* to the address identifier store 24. Alternatively, the address identifier store may be implemented on a folder by folder basis. Each folder may have its own associated address identifier store. In this way, the system tracks occurrences of address identifiers at the folder level.

Central processor 14 may continue its comparisons by comparing the address identifier 100*b* and the address identifier 100*c* against the address identifier store 24. Then, the central processor 14 may receive message 102 from the set of stored messages 16. The central processor 14 may extract the address identifier 102*a*, the address identifier 102*b*, and the address identifier 102*c* from the message 102. It may perform the same comparisons for the address identifier 102*a*, the address identifier 102*b*, and the address identifier 102*c* against the address identifier store 24 as it previously did with the address identifier 100*a*, the address identifier 100*b*, and the address identifier 100*c*. The system may repeat the comparison step after receiving message 104.

The central processor may next calculate the predictive address values for each address in the address identifier store 24. The predictive address value for an address identifier equals 1/n where n equals the number of messages in the set of stored messages 16 that contain that address identifier. For each address identifier in the address identifier store 24, the central processor 14 may request each message in the set of stored messages 16. Once the central processor 14 receives each message from the set of stored messages 16, it may check the metadata for that unique address identifier and may tally a result. Checking the meta data for a message involves looking for an address identifier in the fields of the meta data containing addresses. For example, turning to an illustrative set of messages in FIG. 3, given an address identifier "A," the central processor 14 may check the From, To, CC fields, but not the Subject or Attachment fields since those fields do not normally contain senders and recipients of messages. Finding "A" in the From field of message 2 would signify that the address identifier exists in message 2. Likewise, finding "A" in the To field indicates that message 3 contains "A." The Central processor would then add one to the result to reflect that the address identifier was found in this message. The central processor adds one even where the message contains the address identifier in multiple fields. For example, message 2 contains "A" in both the From and CC fields. The Central processor would only tally 1 for message 2 despite the fact that "A" exists twice in the meta data. Then, the central processor 14 divides 1 by the tallied result to arrive at the predictive address value for that address identifier. In the set of messages of FIG. 3, the number of times that "A" exists in the meta data of the set of messages is 4, but the tallied number of occurrences is 3. Dividing 1 by 3 gives a predictive address value of 0.33. "G" exists once. Therefore, the predictive address value for "G" is 1/1 or 1. The more infrequently an address identifier occurs in the set of stored messages 16, the better a predictor the address is for clustering messages together.

Alternatively, the central processor may calculate the predictive address values for each address in the address identifier store 24 using other algorithms that render a value which is an inverse function of the number of occurrences of an address. The predictive address value for an address identifier may equal any function that satisfies the condition that n1>n2=>f(n1)<f(n2), where n equals the number of messages in the set of stored messages 16 that contain that address identifier. For each address identifier in the address identifier store 24, the central processor 14 may request each message in the set of stored messages 16. Once the central processor 14 may receive each message from the set of stored messages 16, it may check the metadata for that unique address identifier and may tally a result. Checking the meta data for a message involves looking for an address identifier in the fields of the meta data containing addresses. For example, turning to an illustrative set of messages in FIG. 3, given an address identifier "A," the central processor 14 may check the From, To, CC fields, but not the Subject or Attachment fields since those fields do not normally contain senders and recipients of messages. Finding "A" in the From field of message 2 would signify that the address identifier exists in message 2. Likewise, finding "A" in the To field indicates that message 3 contains "A." The Central processor would then add one to the result to reflect that the address identifier was found in this message. The central processor adds one even where the message contains the address identifier in multiple fields. For example, message 2 contains "A" in both the From and CC fields. The Central processor would only tally 1 for message 2 despite the fact that "A" exists twice in the meta data. Then, the central processor 14 divides 1 by the tallied result to arrive at the predictive address value for that address identifier. In the set of messages of FIG. 3, the number of times that "A" exists in the meta data of the set of messages is 4 but the tallied result is 3. 3 is thus the number of tallied occurrences and the resulting value is f(3). "G" exists once. Therefore, the predictive address value for "G" is f(1), where f(1) is larger than f(3). The more infrequently an address identifier occurs in the set of stored messages 16, the better a predictor the address is for clustering messages together. Different functions may be used to render different predictive values which may make the predictive values less susceptible to extreme number of n.

Returning to FIG. 1, the central processor 14 may store each predictive address value in the predictive address value store 18.

The central processor 14 may classify a new message based on the predictive address values and resulting predictive message values. The central processor 14 may receive an incoming message 32 from an external source, such as the incoming message processor 30. The central processor 14 may extract metadata from incoming message 32. For example, in an email messaging system, the metadata may include header information such as a from address, to address, cc addresses, subject, date, routing information, and priority status. As part of the metadata, central processor may retrieve incoming address identifiers 32a and 32b. Incoming address identifiers 32a and 32b may be extracted from the "from" or "cc" fields of the incoming message 32.

Central processor 14 may then calculate the predictive message value for each message in the set of stored messages 16. The central processor 14 may add the predictive address values for each address identifier extracted from the incoming message 32 that appears in the metadata for the message retrieved. First, the central processor 14 may retrieve the incoming address identifiers 32a and 32b from the incoming message 32. Then, the central processor 14 may retrieve a message from the set of stored messages 16. Next, it may set the memory 20, used to keep a running total of predictive address values, to zero. The central processor 14 may extract the address identifiers from the metadata of the message retrieved. It may compare the incoming address identifier 32a against the address identifiers from the retrieved message. If the incoming address identifier exists in the address identifiers from the retrieved message, the central processor 14 may add the predictive address value from the predictive address value store 18 associated with the incoming address identifier 32a to the memory 20. The central processor then may perform the comparison of the incoming address identifier 32b with the address identifiers of the retrieved message. Likewise, if the incoming address identifier 32b exists in the address identifiers of the retrieved message, the central processor 14 adds the predictive address value for the incoming address identifier 32b to the memory 20. The value in the memory 20 is thus the predictive message value for the message retrieved.

The central processor 14 may store the predictive message value for the message retrieved into the predictive message value store 22. Central processor 14 may retrieve each remaining message from the set of stored messages 16 and may repeat the process here described to arrive at a new predictive message value for the newly retrieved message which it again stores in the predictive message value store 22.

At this point, predictive memory value store 22 may contain values which determine how likely the incoming message 32 is associated with each of the messages in the set of stored messages 16. Central processor 14 may search the predictive message value store 22 to find the message with the highest predictive message value. It may classify the incoming message 32 with the message having the best predictive message value in the set of stored messages 16 by adding the incoming message 32 to the folder in the set of stored messages 16 associated with that message having the best predictive message value.

Having the "best" predictive message value may be based on various criteria suitable to the particular task that needs to be accomplished. For example, having the "best" predictive message value may be characterized by having the highest predictive message value. Alternatively, "best" may indicate the lowest message value. This scenario may occur where the system calculates a predictive address value based on totaling the number of messages that contain the respective address identifier. In this case, the lower the predictive address value, the more uniquely a particular address identifier can be used to cluster two messages together.

In one alternative embodiment, the system may update the predictive address values each time an incoming message is processed to keep the system up to date. For each address identifier in the incoming message 32, the central processor 14 may check to see if it exists in the address identifier store 24. If the address identifier does not exist in the address identifier store 24, the central processor 14 may add the unique address identifier to the address identifier store 24 and may assign one to the predictive address value in the predictive address value store for that unique address identifier. The reason that the predictive address value is one is because if the address identifier from the incoming message 32 is unique, the incoming message is the only message with the address identifier. If the address identifier exists in the address identifier store 24, the central processor 14 knows that there is one more additional occurrence of that address identifier in the address identifiers of the messages in the set of stored messages 16 because the incoming message 32 with that address identifier was just added to the set of stored messages 16. The central processor 14 may recalculate the predictive address value in two steps. First, the equation $x=1/y$ may be used to generate the number of occurrences for the currently existing predictive address value. Y may be the currently existing predictive address value and x may be the number of occurrences. Then, the central processor may apply the equation $z=y+1$ to add the new occurrence recently stored to the value y. The central processor 14 may recalculate by using the formula new predictive address value=$1/z$ and may reassign the new predictive address value to the predictive address value for the address identifier.

In another alternative embodiment, the system does not update the predictive address values each time an incoming message is processed. Instead, the system may periodically perform an initialization step illustrated above to update the system. This may save system resources by removing the expensive update step to a time when the system is otherwise unutilized.

Figure 2:
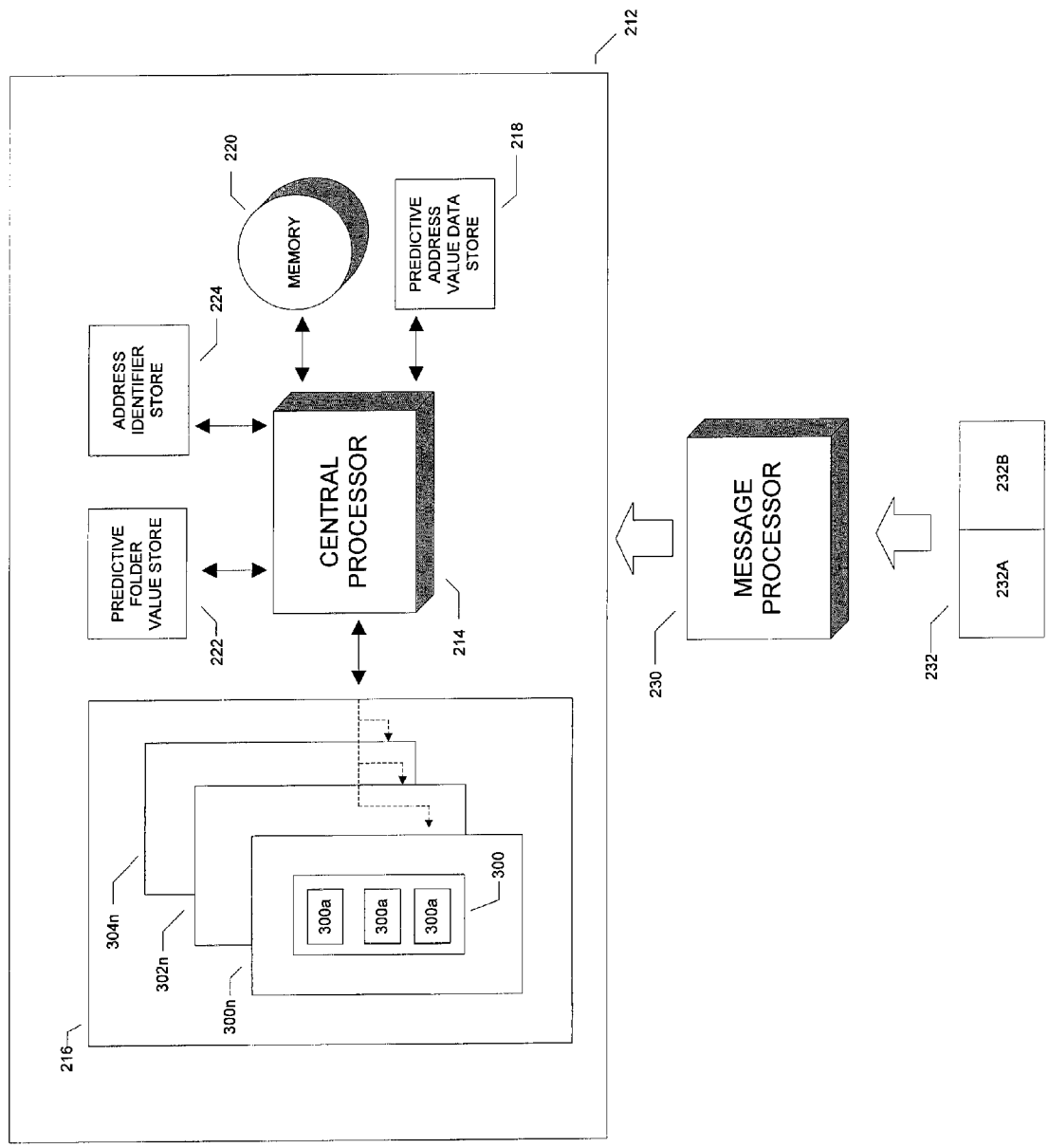
FIG. 2 depicts a block diagram of another embodiment of the present invention capable of classifying incoming messages based on predictive folder values.

In yet another embodiment, as illustrated in FIG. 2, the system may reduce processing requirements by calculating predictive values, not on a message level, but on a folder level. By way of illustration only, a folder may be thought of as a folder that contains multiple messages.

FIG. 2 illustrates a message classification system including a messaging system 212. The message system 212 includes a central processor 214 in communication with a set of stored messages 216 for storing a user's messages, a predictive address value data store 218 for storing the predictive values for each address in the messaging system 212, memory 220, and predictive folder value store 222. Messages 300, 302, and 304 are stored in the set of stored messages 216 within folders 300n, 302n, and 304n respectively. The messaging system 212 is also in communication with incoming message processor 230 that delivers incoming message 232 to the messaging system 212 and thereby classifies the incoming message 232 with one of the messages 300, 302, or 304 based at least in part on the predictive message values of the respective folder.

Central processor 214 may create the address identifier store 224 much as it did when it created the address identifier store 24 in FIG. 1 during the initialization step therein. The central processor may next calculate the predictive address values for each address in the address identifier store 224. The predictive address value for an address identifier may equal $1/n$ where n equals the number of folders in the set of stored messages 216 that contain that address identifier. For each address identifier in the address identifier store 224, the central processor 214 may request each folder in the set of stored messages 216. Once the central processor 214 receives each folder from the set of stored messages 216, it may check the metadata for that unique address identifier and may tally the result. Then, the central processor 214 may divide 1 by the tallied result to arrive at the predictive address value for that address identifier.

The central processor 214 may store each predictive address value in the predictive address value store 218.

The central processor 214 may next receive incoming messages and may classify them at least in part on the predictive address values and resulting predictive folder values. The central processor 14 may receive an incoming message 232 from the incoming message processor 230. As above, it may extract incoming address identifiers 232a and 232b from the incoming message 232. Next, it may calculate predictive folder values for each folder of messages. The central processor may set memory 220 to zero. The central processor 214 may retrieve an entire folder of messages from the set of stored messages 216 at a time. For each retrieved folder, the central processor 214 may check to see if the incoming address identifier 232a exists in any of the metadata of any message in that retrieved folder. If so, the central processor 214 may add n times the predictive address value for the incoming address identifier 232a to the memory 220 where n is the number of messages containing the address identifier in the folder. The value in the memory 220 is thus the predictive folder value for the folder retrieved.

The central processor 214 may store the predictive folder value for the folder retrieved into the predictive folder value store 222. Central processor 214 may retrieve each remaining folder from the set of stored messages 216 and repeats the process here described to arrive at a new predictive folder value for the newly retrieved folder which it again stores in the predictive folder value store 222.

To illustrate, the system may contain three folders. Folder 1 may contain message 1 with addresses a, b, and c. Message 2 may contain addresses a, and c. Folder 2 may contain one message with addresses a, and c. Folder 3 may contain two messages with address d. An incoming message may contain addresses a and d. Since address a occurs in two folders, the predictive address value for a is ½. For b, the value is 1, c is ½, and d is 1. For the incoming message, the system may first calculate the predictive folder value for each folder for address a. Since a appears twice in folder 1 and a has a predictive address value of ½, the system calculates 2 times ½ to arrive at a value of 1. Since d does not appear in folder 1 the system calculates 0 times 1 (the predictive address value of d) to arrive at 0. The system then adds these two values together to arrive at 1, the predictive folder value for the incoming message for folder 1. For folder 2, a appears once. The first value is then ½. Since d again does not occur in folder 2, the second value is 0. Thus, the predictive folder value for the incoming message for folder 2 is ½. Finally, for folder 3, the first value is 0 since a does not appear in folder 3. The second value for folder 3 is 2 since d appears twice in folder 3 and d has a predictive address value of 1. Thus, the folder 3 has a predictive folder value of 2.

Returning to FIG. 2, the central processor 214 may search the predictive folder value store 222 to find the folder with the highest predictive folder value and may associate incoming message 232 with that folder in the set of stored messages 216. The processing time may be greatly reduced because instead of comparing against all messages each time an incoming message arrives, the system only need compare against each folder. Associating incoming message 232 with the folder having the highest predictive folder value may update the predictive folder value for the target folder.

In another embodiment, the system may use pattern matching within the subject line to aid in classifying messages. The central processor, prior to calculating the predictive message or folder values for the incoming message, may perform a search of all messages in the set of stored messages and associate the incoming message with any messages with fully or partially matching subject lines. Alternatively, matching messages with subject lines may be employed where multiple messages tie with the highest predictive message or folder values. This method may be used to resolve the tie and better classify the messages.

For example, from the illustration in FIG. 1, the incoming message 32 may contain the subject line, "Reminder for meeting Oct. 10, 2005, 8:30 am" In the above embodiment, the central processor 14, before extracting the incoming address identifier 32a and the incoming address identifier 32b, may retrieve each message in the set of stored messages 16 looking for the identical subject line "Reminder for meeting Oct. 10, 2005, 8:30 am." If a match is found, then the central processor 14 clusters the incoming message 32 with the matching message.

Alternatively, the central processor 14 may find two or more messages with the same predictive message values in the predictive message value store 22. This may occur for many reasons. Turning to FIG. 3, first, by way of illustration only, the incoming message 32 may contain the incoming address identifier 32a of "E" and the incoming address identifier 32b of "G" Both "E" and "G" may exist once each in all address identifiers of messages in the set of stored messages 16. The predictive address values for the incoming address identifier 32a and the incoming address identifier 32b would be 1 (predictive address value=1/occurrences in the set of stored messages 16). As shown in FIG. 3, message 7 contains "E" but not "G." Vise versa, Message 10 contains "G" but not "E." The predictive message values for messages 7 and 10 would then each be 1. The central processor 14, to resolve the tie, may compare the subject lines of messages 7 and 10 against the subject line of the incoming message 32 to see if they match with the subject line of the incoming message 32. If message 7 matches but message 10 does not, the central processor 14 may cluster the incoming message 32 with message 7. Vise versa, if message 10 matches but message 7 does not, the central processor 14 may cluster the incoming message 32 with message 10. It will be obvious to those ordinarily skilled in the art to illustrate further examples of how two or more predictive message values can be equal and how to apply the subject line matching step.

Still further, the central processor 14 may employ any number of alternative methods for finding matching subject lines. Examples include, but are not limited to, matching based on the subject line with the greatest overlapping sub-phrase, matching with similar phrases gathered from concept searching all other messages, and the like.

In a further alternative embodiment, the system may store incoming messages that cannot immediately be classified with other messages in a temporary folder for later processing. For example, if a tie occurs between the predictive message or folder values generated for an incoming message, or the difference between these values is within a certain system or user defined range, an operator prompt may be made for further guidance on how to classify the message. Similarly, absence of the incoming message's address identifiers may call for an operator prompt.

The central processor, having stored not immediately classifiable messages in a temporary folder 36 for later processing may combine address identifiers of messages together to increase the possibility of finding a stronger predictive message value. Returning to the illustration in FIG. 1, the central processor 14, upon determining that the incoming message 32 is not immediately classifiable, may attempt to combine the incoming message 32 with other messages in the temporary message folder 36. The incoming message 32 has a subject line of "new employee." The central processor 14 may add the incoming message 32 to the temporary message folder 36 after finding no appropriate message in the temporary message folder 36 to combine the incoming message 32 with. The central processor 14 then may receive another incoming message 38 from the incoming message processor 30. Again, determining that the incoming message 38 is not immediately classifiable, the central processor 14 may attempt to combine the incoming message 38 with messages in the temporary message folder 36. The incoming message 38 has a subject line of "new employee." The central processor 14 may retrieve each message in the temporary message folder 36 in turn. As part of this step, the central processor 14 may retrieve the earlier stored incoming message 32. The central processor 14 may check whether the subject lines of the incoming message 32 and the incoming message 38 match. Finding that they do, the central processor 14 may extract the address identifiers 32a and 32b and combines them into a set of address identifiers with the address identifiers already extracted from the incoming message 38. This combination occurs only if the address identifiers 32a and 32b do not already exist in the address identifiers extracted from the incoming message 38.

The central processor 14 may calculate the predictive message values for each message in the set of stored messages 16 using the combined address identifiers from the incoming message 32 and the incoming message 38. If a suitable message is found from the predictive message values calculated, then the central processor 14 may cluster the incoming message 32, the incoming message 38, and the suitable message together.

Storing messages in the temporary folder additionally allows the user to view those messages and to manually cluster those messages with other messages in the system.

In another embodiment, the central processor 14 may use different combinations of the incoming address identifiers of one single incoming message to classify messages. The central processor 14 may use incoming address identifier 32a alone to calculate the predictive message values and thereby cluster the incoming message 32 with a message in the set of stored messages 16. Alternatively, the central processor 14 may use the combination of incoming address identifiers 32a and 32b to classify the message. Finally, an incoming address identifier 32b may be used alone to classify the message.

Figure 4:
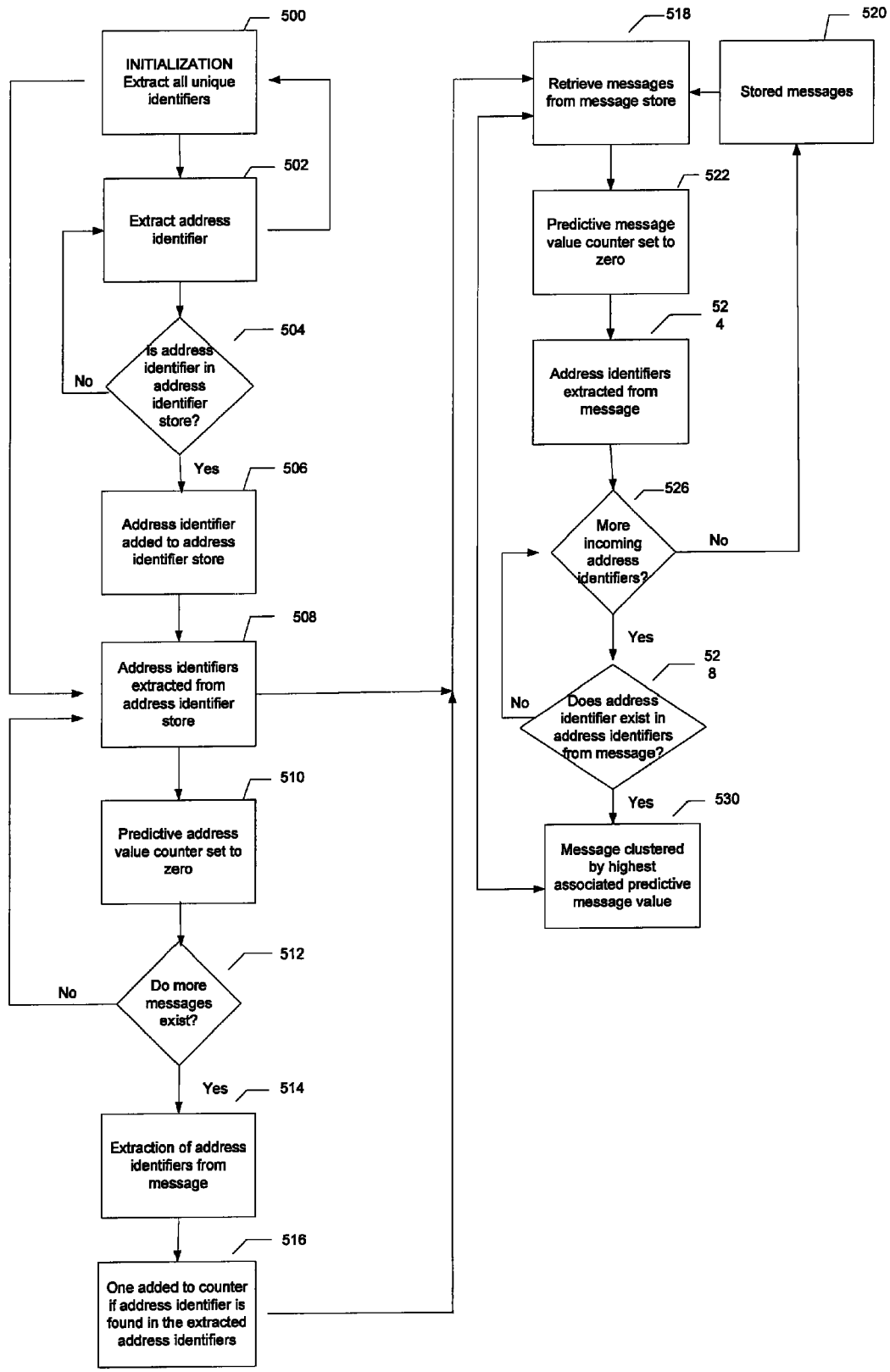
FIG. 4 contains a flowchart of illustrative steps in the current invention capable of classifying messages based on predictive message values.

FIG. 4 depicts illustrative steps in one embodiment of the present invention. The method involves two tasks, initialization and processing of incoming messages. Step 500 begins the initialization process while step 518 begins the processing of incoming messages. In step 500, the initialization task begins by extracting all unique address identifiers. In step 500, the central processor receives a message from a set of stored messages. If no more messages exist in the stored messages, the processor goes to step 508 to calculate predictive address values. In step 502, the processor extracts each address identifier in turn from the extracted message. If no more address identifiers exist in the extracted message, the processor goes to step 500 to retrieve the next message. In step 504, if the address identifier exists in the address identifier store, the processor goes to step 506, otherwise, the processor goes to step 502 to retrieve another address identifier. In step 506, the processor adds the address identifier to the address identifier store.

Step 508 begins the subtask of calculating predictive address values. The processor extracts each address identifier in turn from the address identifier store in step 508. If no more address identifiers exist, the processor goes to step 518 to process incoming messages. In step 510, a counter used to track the predictive address value is set to 0. In step 512, the processor extracts each message in turn from the set of stored messages. If no more messages exist in the set of stored messages, the counter is associated with the address identifier in the predictive address value store and the processor goes to step 508 to retrieve the next address identifier. The processor extracts the address identifiers associated with the extracted message in step 514. In step 516, the processor adds one to the counter if the address identifier is found in the extracted address identifiers from step 514.

At this point, the initialization task is completed, and the processor begins to process incoming messages. In step 518, the processor retrieves each incoming message from the incoming message processor and processes it. Each message is retrieved in turn from the set of stored messages in step 520. If no more messages exist in the set of stored messages, the processor goes to step 530 to search for the highest predictive message value. In step 522, the processor sets a counter to keep track of the predictive message value to 0. In step 524, the processor extracts the address identifiers from the extracted message. Each incoming address identifier is retrieved from the incoming message in turn in step 526. If no more incoming address identifiers exist in the incoming message, the processor associates the message with the counter in the predictive message value store and goes to step 520 to retrieve the next message. In step 528, if the incoming address identifier exists in the address identifiers extracted from the message, then the processor adds the predictive address value from the predictive address value store associated with the incoming address identifier to the counter. Otherwise, the processor goes to step 526 to try the next incoming address identifier.

The next subtask searches for the highest predictive message value and clusters the incoming message. In step 530, the processor finds the message with the highest associated predictive message value in the predictive message value store and clusters the incoming message with that message. The processor then returns to step 518 to process the next incoming message.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. An adaptive message classification system comprising:
   a message server for handling message traffic of a user;
   a classification system having a plurality of folders therein, each folder storing previously received messages of the user;
   a data store to store predictive address values for address identifiers contained in stored messages in the messaging classification system, wherein each address identifier is associated with a predictive address value, the predictive address value is calculated by tallying number of occurrences of the address identifier in all stored messages and applying a predetermined function to the tallied number, the predetermined function generates a larger number for an address identifier that appears in a fewer number of stored messages than an address identifier that appears in a larger number of stored messages, and repeated appearances of the address identifier in one stored message count as one occurrence for the tallying; and a message classification agent, responsive to a newly received message, to:
    check each stored message among the plurality of folders to identify a stored message as having a best predictive message value than predictive message values for other stored messages among the plurality of folders, wherein each predictive message value for a respective stored message is calculated by:
        extracting an address identifier from the newly received message,
        comparing the extracted address identifier with each address identifier in the respective stored message,
        adding a predictive address value associated with the extracted address identifier to a running summation for the respective stored message when the extracted address identifier exits in the respective stored message, and
        repeating the above extracting, comparing and adding steps for each address identifier contained in address fields of the newly received message to get a final result of the running summation for the respective previously stored message, wherein the best predictive message value corresponding to a previously stored message is the highest final result among all running summations for all previously stored messages,
    select the folder storing the identified previously stored message as the destination folder,
    cluster the newly received message with the identified stored message, and
    store the newly received message in the selected destination folder.

2. The adaptive message classification system of claim 1, wherein the message classification agent identifies the previously stored message with the best predictive message value based at least in part by using pattern matching.

3. The adaptive message classification system of claim 1 further comprising:
    a temporary folder for storing previously unclassifiable messages and holding a newly received, unclassified message that is not immediately classifiable; and
    the unclassified newly received message having a predictive message valued calculated based at least in part on combining address identifiers of messages in the temporary folder.

4. The adaptive message classification system of claim 1, wherein the adaptive message classification system is to function as an email system.

5. An adaptive message classification system comprising:
    a message server for handling message traffic of a user;
    a classification system having folders therein, each folder storing previously received messages of the user;
    a data store to store predictive address values for address identifiers in the messaging classification system, wherein each address identifier contained in stored messages is associated with a predictive address value, the predictive address value is calculated by tallying number of occurrences among the folders and applying a predetermined function to the tallied number, the predetermined function generates a larger number for an address identifier that appears in a fewer number of folders than an address identifier that appears in a larger number of folders, and repeated appearances of the address identifier in one folder count as one occurrence for the tallying; and a message classification agent, responsive to a newly received message, to:
    extract address identifier(s) from the newly received message,
    calculate a predictive folder value for each folder based on the extracted address identifier(s), wherein the predictive folder value for a respective folder is calculated by:
        for each extracted address identifier, multiplying a predictive address value associated with the extracted address identifier by a number representing occurrences of the extracted address identifier in the respective folder, and
        adding the multiplication results together to generate the predictive folder value for the respective folder,
    select the folder having the highest predictive folder value as the destination folder, and
    store the newly received message in the selected destination folder.

6. A computer implemented method for automatically classifying messages comprising:
    storing, by a computer processor, predictive address values for address identifiers contained in all stored messages in a messaging classification system, the messages being stored among a plurality of folders of the messaging classification system, wherein each address identifier is associated with a predictive address value, the predictive address value is calculated by tallying number of occurrences of the address identifier in all stored messages and applying a predetermined function to the tallied number, the predetermined function generates a larger number for an address identifier that appears in a fewer number of stored messages than an address identifier that appears in a larger number of stored messages, and repeated appearances of the address in one stored message count as one occurrence for the tallying
    extracting, by the computer processor, address identifier(s) from a newly received message;
    checking, by the computer processor, each stored message to calculate a predictive message value for each stored message, the predictive message value for a respective stored message being calculated by:
        for each address identifier extracted from the newly received message,
            comparing the extracted address identifier with each address identifier in the respective stored message, and
            adding a predictive address value associated with the extracted address identifier to a running summation for the respective stored message when the extracted address identifier exits in the respective stored message,
        obtaining a final result of the running summation for the respective stored message, the final result of the running summation for the respective stored message being the predictive message value,
    identifying, by the computer processor, a stored message as having a best predictive message value, wherein the best predictive message value is the highest final result among all running summations for all stored messages;
    selecting, by the computer processor, the folder storing the identified stored message as the destination folder;

clustering, by the computer processor, the newly received message with the identified stored message; and storing, by the computer processor, the newly received message in the selected destination folder.

7. The computer implemented method for automatically classifying messages of claim 6, wherein the predictive address value of an extracted address identifier is obtained by dividing one by a tallied number of occurrences of the respective address identifier among previously the all stored messages.

8. The computer implemented method for automatically classifying messages of claim 6, wherein clustering the incoming message with a message contained within the set of stored messages is aided at least in part by pattern matching.

9. The computer implemented method for automatically classifying messages of claim 6 further comprising:

temporarily storing a newly received message that is not immediately classifiable in a temporary folder that holds previously received, unclassifiable messages; and calculating the predictive message values based at least in part on combining address identifiers of messages in the temporary folder.

10. The computer implemented method for automatically classifying messages of claim 6 further comprising:

functioning as an email system.

11. A computer implemented method for automatically classifying messages comprising:

storing, by a computer processor, predictive address values for address identifiers in the messaging classification system, wherein each address identifier contained in stored messages is associated with a predictive address value, the predictive address value is calculated by tallying number of occurrences among the folders and applying a predetermined function to the tallied number, the predetermined function generates a larger number for an address identifier that appears in a fewer number of folders than an address identifier that appears in a larger number of folders, and repeated appearances of the address identifier in one folder count as one occurrence for the tallying;

extracting, by the computer processor, identifier(s) from a newly received message;

calculating, by the computer processor, a predictive folder value for each folder based on the extracted address identifier(s), wherein the predictive folder value for a respective folder calculated by:

for each extracted address identifier, multiplying a predictive address value associated with the extracted address identifier by a number representing occurrences of the extracted address identifier in the respective folder, and adding the multiplication results together to generate the predictive folder value for the respective folder;

selecting, by the computer processor, the folder having the highest predictive folder value as the destination folder; and storing, by the computer processor, the newly received message in the selected destination folder.

12. The adaptive message classification system of claim 1, wherein the predetermined function f( ) satisfies the condition that if $n1 > n2$, then $f(n1) < f(n2)$, $n1$ and $n2$ represent tallied numbers for two different address identifiers.

13. The adaptive message classification system of claim 12, wherein the predetermined function is an inverse function.

14. The adaptive message classification system of claim 5, wherein the predetermined function f( ) satisfies the condition that if $n1 > n2$, then $f(n1) < f(n2)$, $n1$ and $n2$ represent tallied numbers for two different address identifiers.

15. The adaptive message classification system of claim 14, wherein the predetermined function is an inverse function.

16. The adaptive message classification system of claim 6, wherein the predetermined function f( ) satisfies the condition that if $n1 > n2$, then $f(n1) < f(n2)$, $n1$ and $n2$ represent tallied numbers for two different address identifiers.

17. The adaptive message classification system of claim 16, wherein the predetermined function is an inverse function.

18. The adaptive message classification system of claim 11, wherein the predetermined function f( ) satisfies the condition that if $n1 > n2$, then $f(n1) < f(n2)$, $n1$ and $n2$ represent tallied numbers for two different address identifiers.

19. The adaptive message classification system of claim 18, wherein the predetermined function is an inverse function.

* * * * *